Jan. 9, 1945.  C. J. MAY  2,366,925
OIL DELIVERY CONTROL APPARATUS
Filed Feb. 9, 1942
*Fig. 1*
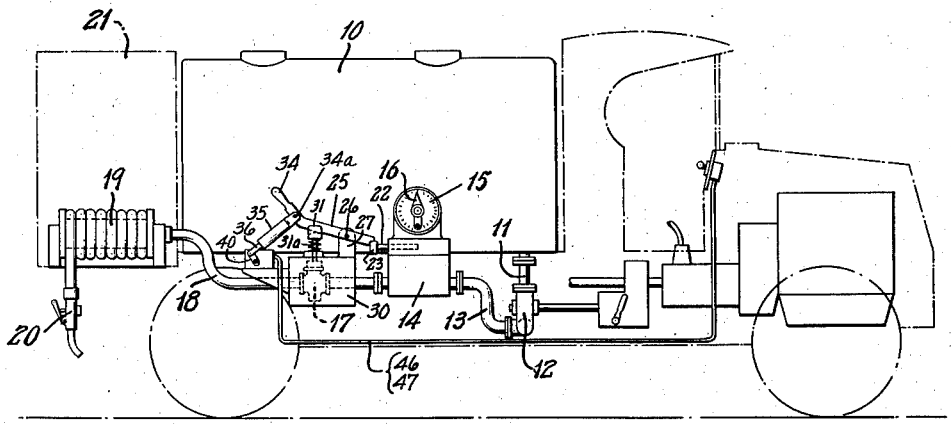
*Fig. 2*
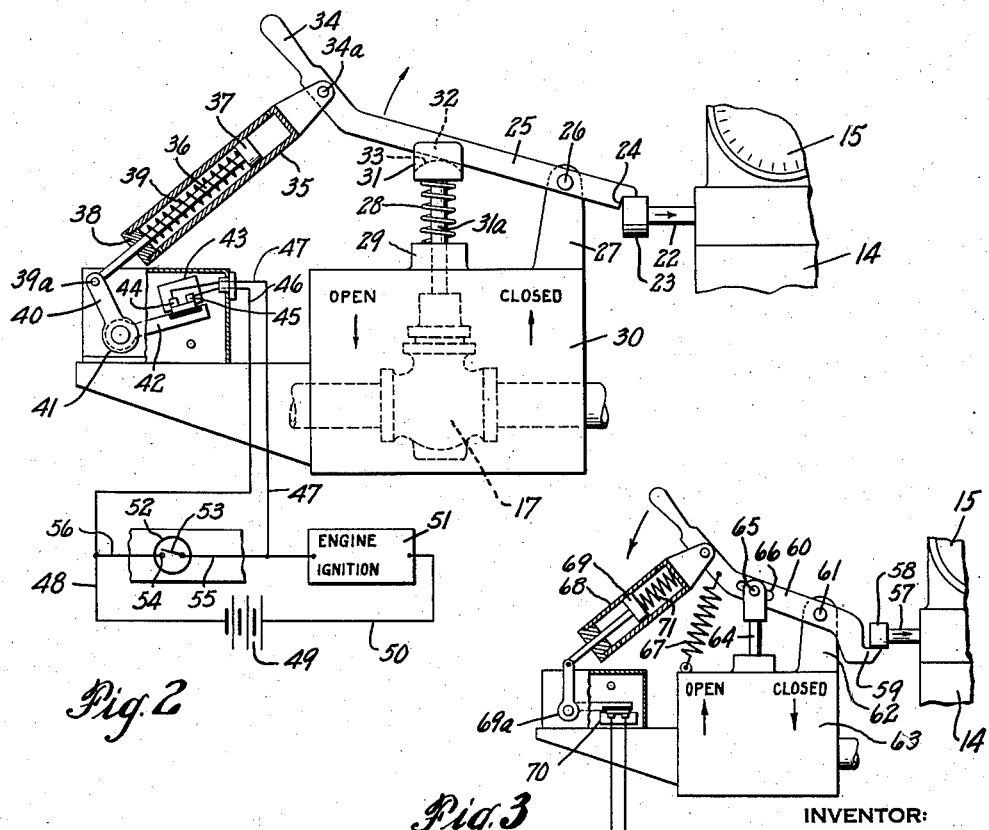
*Fig. 3*
INVENTOR:
CHESTER J. MAY
BY H. G. Manning
ATTORNEY.

Patented Jan. 9, 1945

2,366,925

UNITED STATES PATENT OFFICE 2,366,925

OIL DELIVERY CONTROL APPARATUS

Chester J. May, Waterbury, Conn.

Application February 9, 1942, Serial No. 430,100

3 Claims. (Cl. 222—63)

This invention relates to liquid delivery apparatus and more particularly to an automatically controlled mechanism for shutting off the flow of oil to a receiving tank when a predetermined amount has been delivered from the supply tank of a motor-operated truck.

One object of this present invention is to provide an oil delivery apparatus of the above nature having a control mechanism arranged to automatically shut off the ignition switch of the truck motor and also stop the operation of the pump, thereby avoiding waste of gasoline and oil and the wear and tear of the motor and pump mechanism.

A further object of this invention is to provide an oil delivery apparatus of the above nature which will be simple in construction, inexpensive to manufacture, easy to install and manipulate, compact, ornamental in appearance, and very efficient and durable in use.

With these and other objects in view, there have been illustrated on the accompanying drawing, two forms in which the invention may be conveniently embodied in practice.

In the drawing:

Figure 1 represents a side view of the oil delivery control apparatus at it appears when installed upon an oil truck, the outline of which is shown by dotted lines.

Figure 2 is a side view on a larger scale of a portion of the control mechanism for automatically closing the oil supply valve and opening the ignition circuit switch when the desired amount of oil has been delivered—the electrical circuits being shown diagrammatically.

Figure 3 is a side view of a modified form of oil delivery control mechanism also embodying the invention.

Modern oil delivery trucks are generally provided with fluid meters which may be set accurately to shut off the oil supply valves automatically after any desired amount of oil has been delivered. With such a delivery truck, however, the motor and pump will continue to operate until such time as the operator is able to manually shut off the ignition switch, thus resulting in a waste of gasoline and oil, and a considerable amount of wear and tear upon the engine and pump mechanism.

By means of the present invention, the above and other disadvantages have been entirely avoided by the provision of means for automatically opening the motor ignition switch for stopping the engine and pump at the same time that the oil valve is closed automatically by the meter control mechanism.

Referring now to the drawing wherein like reference numerals denote corresponding parts throughout the several views, the numeral 10 indicates the oil tank of a delivery truck having a bottom oil delivery pipe 11 leading to a pump 12 from which the oil passes through a pipe 13 to a meter mechanism 14 having a dial 15 and a manually-set pointer 16 for indicating the exact amount of oil to be delivered. From the meter mechanism 14 the oil is adapted to pass through a shut-off valve 17 to a pipe 18 leading to a flexible hose 19 having a manually-controlled nozzle 20 on the free end thereof, said hose being normally coiled up in the rear compartment 21 of the truck as shown in Figure 1.

The meter mechanism 14 is provided with a laterally extending latch rod 22 having an enlarged latching head 23 upon the end thereof. Mechanism, not shown, is also provided in the meter mechanism 14 for pulling the latch rod 22 to the right (as viewed in Figures 1 and 2) after the desired amount of oil has been delivered to the receiving tank (not shown) through the nozzle 20. The latch head 23 is adapted to seat in an angular recess 24 formed in the end of a valve-operating lever 25 pivotally mounted on a pin 26 supported by an upstanding post 27.

When the latch rod 22 is moved to the right, the lever 25 will be released and permitted to swing in a clockwise direction under the influence of a strong compression spring 28, the lower end of which engages an upstanding boss 29 on the valve casing 30. The upper end of the spring 28 engages a plug member 31 of a valve rod 31a, and said plug member 31 is bifurcated at its upper end 32 to freely embrace the intermediate portion of the lever 25. The plug member 31 is provided with a convex cam surface 33 between the bifurcated portions thereof to provide a smooth engagement with the lever 25.

At the end of the lever 25 opposite from the recess 24 provision is made of an upwardly inclined handle 34 to which is connected by a pivot pin 34a a downwardly extending cylinder member 35. Mounted within the cylinder 35 is a piston rod 36 having a piston 37, and said piston rod is adapted to slide freely in a bearing bushing 38 secured in the lower open end of the cylinder 35. A coiled compression spring 39 is located between the piston 37 and the bushing 38. By means of this construction it will be seen that a resilient connection is formed between the cylinder 35 and the piston rod 36, so that when the lever 25 is released by the movement of the latch 22 to the right, the piston rod 36 will be pulled upwardly by the clockwise swinging of the lever 25 under the influence of the spring 28. The piston rod 36 is connected at its lower end by a pin 39a to an upstanding arm 40 of a bell-crank lever 41 which will be swung in a clockwise direction by said piston rod for swinging the movable contact arm 42 of an ignition switch 43 downwardly away from a pair of stationary switch contacts 44 and 45, connected respectively to a pair of conductor wires 47 and 46, the wire 46 being joined by a wire 48 to one terminal of the truck storage battery 49. The other terminal of the battery 49 is connected by a wire 50 to one terminal of the engine ignition 51, the other terminal of which is also connected to the wire 47, as shown in Figure 2.

Operation

In operation, when the desired amount of oil has been delivered to the storage tank of the consumer, the latch rod 22 will be moved automatically to the right by the fluid meter mechanism 14 permitting the lever 25 to swing in a clockwise direction, causing the lefthand end of said lever to pull the cylinder 35 and the piston rod 36 upwardly. This will cause the bell-crank switch lever 41 to move the contact arm 42 away from the fixed contacts 44 and 45, thus automatically opening the engine ignition circuit, and stopping the motor simultaneously with the closing of the oil valve 17. It will be understood that the ignition switch 43 may be reset at any time by merely moving the lever 25 in a counterclockwise direction into the latched position shown in Figures 1 and 2.

In order to permit the engine ignition to be controlled independently of the automatic mechanism herein disclosed, provision is made of an auxiliary switch 52 having a movable contact 53 and a fixed contact 54. The movable contact 53 is connected by a wire 55 to the wire 47, while the stationary contact 54 is connected by a wire 56 to the wire 48. By means of this construction, it will be seen that when the auxiliary switch 52 is closed, the operation of the ignition switch 43 will have no effect upon the ignition system.

Modified form of the invention

In the modified form of the invention, shown in Figure 3, an oil delivery control apparatus is disclosed having a latch rod 57 and an enlarged head 58 similar to the latch rod 22 and latch head 23 of the first form of the invention.

In this instance, however, the latch head is located above the angular end 59 of a lever 60 which is pivoted at 61 on a supporting post 62 upstanding from the valve casing 63. The numeral 64 indicates a control valve rod which is provided with a pin 65 on its upper end which is free to slide in a slot 66 formed in the intermediate portion of the lever 60.

In this form of the invention, provision is made of a tension spring 67 for connecting the lever 60 to the valve casing 63, so that when the latch head 58 moves to the right, the lever 60 will be permitted to swing in a counterclockwise direction under the influence of the tension spring 67 for moving the valve rod 64 downwardly to close the valve instead of moving it upwardly as in the first form of the invention.

Provision is also made of a cylinder 68, a piston 69, a bell crank contact lever 69a, and an ignition switch 70 which are similar in all respects to the first form shown in Figures 1 and 2 except that a spring 71 is located in the upper part of the cylinder 68 above the piston 69 instead of below said piston, and a bell crank lever 69a is provided which swings in a counterclockwise direction to open the switch 70 instead of clockwise as in the first form of the invention.

The operation of the second form of the invention will, of course, be the reverse of that of the first form, to wit: When the latch rod 57 is moved to the right, the lever 60 will resiliently push the piston rod 69 downwardly for opening the ignition circuit.

While there have been disclosed in this specification two forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In an apparatus for simultaneously closing a liquid delivery valve and stopping a pump-operating motor therefor, a slidable valve-actuating rod, a spring-pressed lever connected to said rod, a meter-actuated movable catch having detachable locking engagement with said lever to initially restrain said lever from movement, means operated by the movement of said catch to release said lever and permit said control rod to close said valve under the influence of said spring, and means responsive to the movement of said lever for stopping said pump-operating motor.

2. The invention defined in claim 1, in which said lever is spring-pressed in a downward direction.

3. In an apparatus for simultaneously closing a liquid delivery valve and stopping an internal-combustion motor which drives a liquid pump, a slideable valve-controlling rod, a spring-pressed lever connected to said valve rod, a meter mechanism including a movable catch having detachable engagement with said lever to initially restrain it from movement and to hold the valve in open position, means operated by said meter mechanism to move said catch, a switch for controlling the circuit through the electric ignition system of said motor, means responsive to the movement of said lever to open said switch for shutting off said motor when said lever is released, and a separate circuit in shunt with said first mentioned circuit including a manually controlled switch which when closed renders said automatically-operated ignition switch ineffective.

CHESTER J. MAY.